(12) United States Patent
Gerhart

(10) Patent No.: US 9,348,944 B2
(45) Date of Patent: May 24, 2016

(54) REMOTE COMPUTER DIAGNOSTIC SYSTEM AND METHOD

(71) Applicant: My Computer Works, Inc., Scottsdale, AZ (US)

(72) Inventor: David Gerhart, Gilbert, AZ (US)

(73) Assignee: MY COMPUTER WORKS, INC., Scottsdale, AZ (US)

( * ) Notice: Subject to any disclaimer, the term of this patent is extended or adjusted under 35 U.S.C. 154(b) by 0 days.

(21) Appl. No.: 14/307,767

(22) Filed: Jun. 18, 2014

(65) Prior Publication Data

US 2014/0304296 A1 Oct. 9, 2014

Related U.S. Application Data

(60) Division of application No. 13/869,683, filed on Apr. 24, 2013, now Pat. No. 8,788,875, which is a continuation of application No. 12/486,432, filed on Jun. 17, 2009, now Pat. No. 8,448,015.

(60) Provisional application No. 61/073,090, filed on Jun. 17, 2008.

(51) Int. Cl.

| *G06F 11/00* | (2006.01) |
|---|---|
| *G06F 17/30* | (2006.01) |
| *G06Q 10/06* | (2012.01) |
| *G06F 11/14* | (2006.01) |
| *G06F 9/445* | (2006.01) |
| *H04M 3/51* | (2006.01) |

(52) U.S. Cl.
CPC ............ *G06F 17/30967* (2013.01); *G06F 8/61* (2013.01); *G06F 11/1474* (2013.01); *G06F 17/30424* (2013.01); *G06Q 10/06* (2013.01); *H04M 3/5191* (2013.01)

(58) Field of Classification Search
USPC .......................................................... 714/45
See application file for complete search history.

(56) References Cited

U.S. PATENT DOCUMENTS

| 7,912,932 | B2 | 3/2011 | Barnes-Leon et al. |
|---|---|---|---|
| 2002/0073356 | A1 | 6/2002 | Katayama et al. |
| 2003/0074650 | A1* | 4/2003 | Akgul et al. .................. 717/129 |
| 2003/0084372 | A1 | 5/2003 | Mock et al. |
| 2004/0148333 | A1* | 7/2004 | Manion ................. H04L 63/104 709/201 |
| 2005/0022069 | A1 | 1/2005 | Firman |

(Continued)

OTHER PUBLICATIONS

Office Action dated Jul. 11, 2012 in U.S. Appl. No. 12/486,432.
(Continued)

*Primary Examiner* — Sarai Butler
(74) *Attorney, Agent, or Firm* — Snell & Wilmer L.L.P.

(57) ABSTRACT

The system enables a call center to manage requests from remote computing clients for service. The system provides a number of software tools that allow technicians to perform routine maintenance and correct problems remotely. At the front-end, the system enables requests to be submitted by customers via various mediums, accesses a calendar to determine technician availability, determines the urgency of the request, and schedules an appropriate technician to address the reported problem. The system further includes tools that enable a technician to access a remote computing client to perform a number computer maintenance and diagnostics. Other tools enable the technician to correct problems that are detected through diagnostics. Calls to the call center are recorded and maintained in order to track pending issues and identify potential areas of improvement.

9 Claims, 5 Drawing Sheets

(56) References Cited

U.S. PATENT DOCUMENTS

| | | |
|---|---|---|
| 2005/0144505 A1 | 6/2005 | Takeuchi et al. |
| 2006/0036603 A1* | 2/2006 | Laney .............................. 707/9 |
| 2006/0041660 A1 | 2/2006 | Bishop et al. |
| 2006/0080486 A1 | 4/2006 | Yan |
| 2007/0006324 A1 | 1/2007 | Osada et al. |
| 2007/0174715 A1 | 7/2007 | Kilian |
| 2007/0174716 A1 | 7/2007 | Erdtmann et al. |
| 2008/0082867 A1 | 4/2008 | Jester |
| 2008/0155352 A1* | 6/2008 | Bakthavachalam et al. .... 714/45 |
| 2008/0162428 A1* | 7/2008 | Gaurav .............................. 707/3 |
| 2008/0183852 A1 | 7/2008 | Pramer et al. |
| 2008/0263358 A1 | 10/2008 | Alme |
| 2008/0270612 A1 | 10/2008 | Malakapalli et al. |
| 2009/0055684 A1 | 2/2009 | Jamjoom et al. |
| 2009/0070183 A1 | 3/2009 | Ingman et al. |
| 2009/0150374 A1* | 6/2009 | Dewey et al. ..................... 707/5 |
| 2009/0193059 A1* | 7/2009 | Wall et al. ..................... 707/201 |
| 2009/0254404 A1 | 10/2009 | Eggenberger et al. |
| 2009/0299991 A1* | 12/2009 | Zarzar Charur et al. ......... 707/5 |
| 2009/0299992 A1* | 12/2009 | Klinger et al. ..................... 707/5 |
| 2014/0013155 A1* | 1/2014 | Woolsey ........................ 714/15 |

OTHER PUBLICATIONS

Final Office Action dated Dec. 20, 2012 in U.S. Appl. No. 12/486,432.
Notice of Allowance dated Mar. 13, 2013 in U.S. Appl. No. 12/486,432.
Office Action dated Jul. 30, 2013 in U.S. Appl. No. 13/869,683.
Final Office Action dated Jan. 17, 2014 in U.S. Appl. No. 13/869,683.
Notice of Allowance dated Mar. 31, 2014 in U.S. Appl. No. 13/869,683.

* cited by examiner

REMOTE COMPUTER DIAGNOSTIC SYSTEM AND METHOD

RELATED APPLICATIONS

This application is a divisional of and claims priority to, and the benefit of, U.S. Ser. No. 13/869,683 filed on Apr. 24, 2013 and entitled. "Remote Computer Diagnostic System and Method," which is hereby incorporated by reference. The '683 application is a continuation of and claims priority to, and the benefit of, U.S. Ser. No. 12/486,432 filed on Jun. 17, 2009 and entitled, "Remote Computer Diagnostic System and Method," which is hereby incorporated by reference. The '432 application claims priority to, and the benefit of, U.S. Provisional Ser. No. 61/073,090 filed on Jun. 17, 2008 and entitled "System and method for Managing Computer Technician Tasks," which is hereby incorporated by reference.

FIELD OF THE INVENTION

The present invention generally relates to providing remote computer maintenance based on requests received from multiple communication channels. More particularly, the invention relates to services such as, for example, a Service manager, a Service Calendar, a Sales Manager, Service ticketing, a computing maintenance Multi-Tool, and a computing maintenance Scheduler.

BACKGROUND

While corporate personal computer (PC) users often have access to a "remote help desk", home PC users may not have a convenient system for supporting the PC maintenance and repair functions. Short of calling a PC repair person to a home or taking the PC to a repair center, consumers have not had an easily available resource for addressing PC problems, and specifically, software related problems. Moreover, many home PC users are ill-equipped and/or uninformed to safely configure and use their PC, and importantly, users tend to not want to be bothered with maintaining their PC.

Adequate PC security and maintenance typically involves many layers of applications. Each of these applications are often used separately on a scheduled basis or continuously for greatest effect. Unless the end user executes these programs or allows them to run themselves, the level of security is diminished. Typically, these applications do not consider the other applications when executed which often leads to PC system and application conflicts, thereby resulting in lowered security and system instability.

As such, questions remain as to how to best service the computing needs of the average PC user. Such question include, for example How can customers request service by phone if all technicians are busy?; How can different levels of service be provided in a call queue environment?; How can appointments be integrated into a call queue?; How can unlimited services to subscribers profitably?; How can a call center determine if the computer that the customer is calling about has a subscription?; How can work done on customers' computers be efficiently tracked?; and How can we accurately track technician productivity?

In addition, many third-party PC maintenance and repair services advertise their service to customers through TV, radio and print media. Many marketing companies are often paid based on their performance. This is done by paying the marketing company for each call received or for each new subscription generated by the campaign. Often these marketing companies work together, so for every sale that occurs, multiple companies may need to be paid.

Therefore, there is a need for a solution that addresses the aforementioned concerns, while integrating with the existing proprietary billing systems.

SUMMARY

The system provides remote computer support to customers on a subscription basis. Subscribers receive a thorough tune-up and can call as often as they like for other problems or for 'how to' questions. Customers typically receive service by calling a support line or by sending a message from a customer portal. These requests for service are typically handled in the order they are received. Several subscription options are available, some of which guarantee the customer will be contacted within a specified duration, after the request is received. Unlike many call centers, customers can also set an appointment for a technician to call them. This subscription model, varying levels of service and the ability to set appointments present the challenges not encountered in a traditional call center environment.

To help address these challenges, the system comprises computerized-method for managing call center requests for services from a remote computing client. The method includes receiving, at a service manager module, a request from a customer, wherein said request is received by way of at least one of: telephone, email, or Internet, identifying the customer, determining the urgency of the request, and creating a service request based on the customers type of service or the type of request, wherein the service request is automatically entered into a Service Request Queue based on the identity of customer and/or the urgency of the request.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

Figure 1:
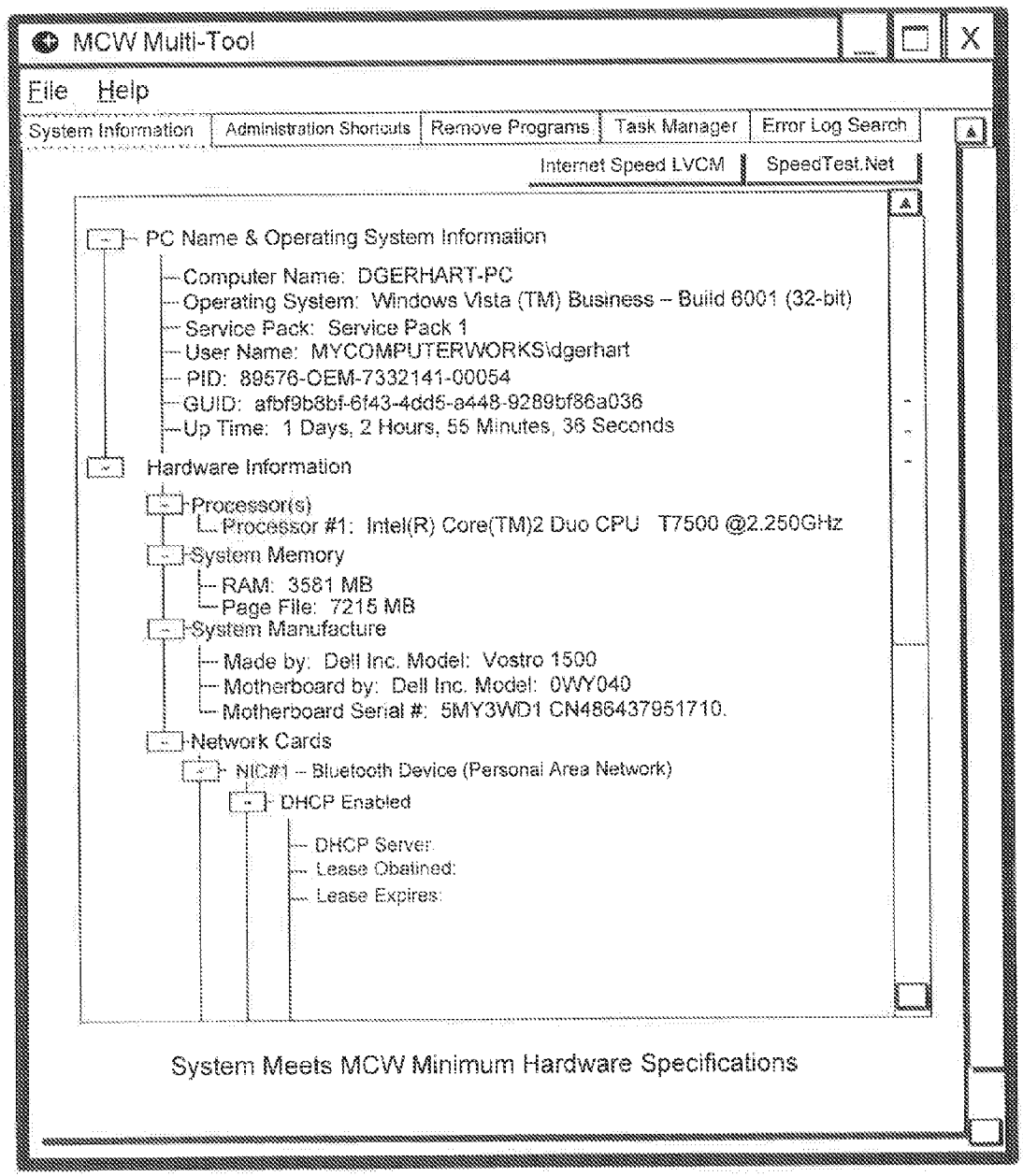
FIG. 1 illustrates a screenshot of a System Information Tab for remotely maintaining a PC, according to an embodiment of the present invention.

The system includes a suite of tools such as, for example, a Service Manager, Calendar, Sales Manager, Ticketing, Multi-Tool and Scheduler, each of which will be disclosed in greater detail herein.

For the sake of brevity, conventional data networking, application development and other functional aspects of the systems (and components of the individual operating components of the systems) may not be described in detail herein. Furthermore, connecting lines, which may be shown in various figures, are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, 95/98/2000, XP, Vista, OS2, UNIX, Linux, Solaris, MacOS, etc.) as well as various conventional support software and drivers typically associated with computers. A user may include any individual, business, entity, government organization, software and/or hardware that interact with a system. A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, and/or the like. Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

As used herein, the term "network" includes any electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of Remote Computer Diagnostic System (RCDS) to further enhance security.

The invention may implement or be implemented within a firewall. A firewall may include any hardware and/or software suitably configured to protect RCDS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other RCDS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", or "business" may be used interchangeably with each other, and each shall mean any person, entity, machine, hardware, software or business that interact with the disclosed systems, or for which the disclosed systems benefit.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Many call centers force their customers to wait on hold until someone is able to help them. Depending on the call volume it can be over an hour before a technician is available to help the customer. To eliminate the need to wait on hold, a reception staff may be dedicated to answer calls. The Receptionist may look up the customer in a local database system, determine if they have active service, and populate a Service Request with the customer's details. If the Receptionist sees that the customer doesn't have active service she can transfer them to Customer Service or Sales. Once the Service Request has been created the Receptionist will add it to the Queue and the customer doesn't need to stay on the phone. Technicians will then handle the Service Request in the order it was received.

If the Receptionist is on the phone and unable to answer when the customer calls, the call is directed to a voice mail system. Service Manager automatically retrieves these voice messages, uses the Caller ID information to locate the customer, determines if they have active service and then creates a Service Request. The voice message is linked to the Service Request and can be played by the Reception staff or technician to listen to the customer's description of his/her issue. Customers can also request service by logging into the Customer Portal and selecting 'Get Help Now' followed by 'Email a technician'. The customer is prompted for his/her question, which is then sent to a specified support email address. Service manager retrieves these emails, looks up the customer and creates an Email Service Request which contains their question. Service requests can also be sent by the System Agent when a system problem is detected (described later). When Service Requests are created, the system determines the customer's level of service and adjusts the position in the queue if desired. Priority One and Executive customers are guaranteed a response from a technician within a certain duration of their request, so these requests are placed at the top of the queue.

The Service Request queue is a multi-client, multi-call center queue designed to manage Service Requests, Appointments, 'Call Afters' and Pro Active Requests. Service Requests are color coded to make request type and status recognizable. When looking at the queue, the technician is able to see who the customer is, the Service Request type (request type), when the request was received, whether they have active service, what kind of service they have, why they are calling and a number of attempts made to reach the customer. The Service Manager lists all Service Requests in descending priority order. Because Service Manager manages the Service Request priority, technicians are better equipped to handle the Service Request with the highest priority by contacting the customer at the top of the list. Technicians may contact a customer even when the customer doesn't have active service in order to assist the customer in reactivating service. Actions performed on Service Requests are recorded, providing a complete picture of who viewed, edited, and accepted the Service Request. In one embodiment, this recorded activity is used to identify areas where efficiency can be improved.

When a technician opens a Service Request they can play the voice message if desired and read all the details that have been captured regarding the customer's issue. If a technician is going to try to help the customer they will accept the Service Request. The technician will then attempt to reach the customer by clicking on the phone number they wish to call. The system records the number that was dialed to successfully reach the customer and the time of the call. This dialing information is used to prioritize which number should be dialed at different times of the day to reach the customer. If the technician is unable to reach the customer they will indicate the result (i.e.: left a voice message, no answer, etc). When unable to reach the customer the Service Request is returned to the queue. The returned Service Request's position in the queue is adjusted so they won't be called again right away. The system uses rules to determine the new position and how many attempts will be made to reach the customer before the request is removed from the queue. If the Service Request is removed from the queue before a staff member is able to reach the customer the system sends an email to the customer letting them know when that an attempt to contact them was made and again provides them with contact information if they still need help.

Service Manager recognizes when it's the first time a new customer is calling for help on his/her computer. These first-time requests are given a higher priority to ensure the customer is contacted in a timely manner. This is done to ensure the new customer has a positive first impression.

The queue refreshes every 30 seconds. This 30-second timer is not something that can be kept in sync for the different users that are using the system. If the information in the queue needed to be reloaded every time it was refreshed, it would eventually create a scalability problem. To overcome this, Service Manager monitors for changes to the queue. If no change has been made then no information is sent when the refresh occurs. All Service Request information in the queue is cached in memory so when changes occur, the queue contents do not need to be reloaded from the database. Individual changes to Service Requests update the cached copy and the changes are saved to the copy of the Service Request in the Database. Periodically, Service Manager will check the database for new Service Requests that may have been received via voice messages or email. These optimizations significantly reduce the bandwidth and database load needed to keep the queue up to date, making the system much more scalable. Since changes to Service Requests are saved to the database in real-time, the optimizations do not present a potential data synchronization problem.

Technicians may search for Service Requests using the Search Page. This page provides a very flexible user interface and makes finding Service Requests easy. Technicians can select any Service Request from the results list and view details about that request. If the technician has the appropriate permissions they can also return the Service Request to the queue if desired.

Customers often need to know when to expect a call back from a technician. Because call times can vary greatly, a call center is often not able to accurately predict delays. To provide information about the customer's position in the queue, the system incorporates a 'MyService' feature. (See example screen shot in Appendix A). When Service Requests are added to the queue a 'MyService' email is sent to the customer. This email confirms that they have been added to the service queue and provides a link to the MyService web page. This page displays their position number in the service queue and updates that position every two minutes. If the customer can no longer wait, they can have their Service Request removed from the queue temporarily and specify a time to return the Service Request to the queue. When this happens the Service Request is identified as a 'Call After'. When the 'Call After' time arrives, the Service Request is put back into the queue. If the customer is ready to get help before their Call After time arrives, they can click on a button on the MyService page to return their Service Request to the queue early.

Customers may also view when a technician has tried, but were unable to reach them. When this happens the MyService page displays the date/time that an attempt was made to reach the customer and may display the new position of the Service Request. If the customer notices this and is ready for service now, they can click on a button that tells the system they are ready. When a customer does this, the delay added to the Service Request is removed causing them to get a call quickly.

Customers may also cancel their Service Request or cancel the current request and schedule an appointment using the Self Scheduling feature described below.

Customers who subscribes to the service may be entitled to a System Tune-up. Customers may set a tune-up appointment with the receptionist or schedule an appointment themselves. For example, three hours may be allocated for tune-up appointments. Customers may also set an appointment to receive help for regular issues. In one embodiment, appointments may not set with any specific technician. Instead, the appointments are converted into Appointment Service Requests and added to the Service Request queue. Appointment Service Requests are shown at the bottom of the call queue and color coded to make it clear that they are Appointments. For example, when the Appointment time is within a configurable threshold (e.g., 15 minutes), the Appointment is moved from the bottom of the queue to the top and the color is changed to Yellow. Because the Appointment Service Request is at the top of the queue the next available technician will accept the appointment and contact the customer. If the Appointment is still in the queue when the appointment time arrives, the color may be changed to Orange, for example. The Orange color code indicates that the appointment is past due and someone needs to call that customer as soon as possible. Technicians will often accept the appointment even if they are still working on another computer. This method of integrating appointments into a Service Request queue allows the system to contact the customer at the correct time without the need for technicians to wait until an appointment time arrives before contacting the customer.

In one embodiment, the system may utilize a proprietary billing system such as, for example, McMurry Interactive Inc. However, such systems do not provide a convenient way to track changes to customer contact details or investigate billing questions. Additional Customer Service functionality has been added to the disclosed Service Manager to address these limitations. A Customer Service web page makes it convenient for staff to locate customers, change contact details, and view their billing history. All changes to customer contact details may be recorded along with who made the change and when the change was made. The Customer Service web page further displays additional information about the customer and their services, which may not visible in other areas of Service Manager. Moreover, staff may interact with the Service Manager to produce a report showing how much technician time has been consumed in the course of servicing each of the customers' computers.

It is often difficult to predict call volume and lack of staff due to illness, for example. When a call center's call volume exceeds what is normally expected, it may be desired to quickly increase the number of technicians that are staffed during a given shift. In one embodiment, the Service Manager consistently monitors a service request backlog. The system is also able to see technician schedules. This information is combined to determine if additional staff is desired in order to maintain or improve response time. When the system determines that more staff is needed, for example, the system will first send a text message to the cell phones of the part-time technicians. These technicians will respond with a code indicating whether they are available to respond to a service request and how long it will take them to respond. The technician's responses are retrieved by Service Manager and an acknowledgement message is transmitted to the system to confirm requests to work. When an adequate number of technicians indicate they are willing to respond, the system may send a text message to the remaining technicians that were notified about the response opportunity. Such a message may include an indicator that the response option is no longer available. As a result, affirmative responses received after the needed resource has been obtained may be met with a response that indicates that the opportunity is no longer available. However, if too few part-time technicians respond and the need for additional staff still exist, the system may send notifications to existing full-time employees offering overtime. Technicians may respond the same way to these notifications and the system will similarly notify the group when the appropriate resources have been committed.

With regard to a Service Manager Summary, the Service Manager General automatically adjusts technician resources when desired to prevent unacceptable backlogs. Voice messages left by customers are retrieved and used to create Service Requests. Emails sent by customers from a customer portal are retrieved and used to create Service Requests. Problem notifications received from the System Agent are retrieved and used to create Proactive Service Requests. The system integrates with the phone system to provide click-to-dial functionality. The system uses previous call records to determine the order in which numbers should be dialed to improve the chances of reaching the customer on the first attempt. Customer Service tasks have been optimized. Service Requests can easily be found using the Service Request Search Page. Service Manager Call Queue prioritizes multiple types of Service Requests allowing us to manage appointments, high priority services, Call Afters, VIPs, Proactive Service Requests and regular Service Requests in a single queue. Queue management is highly optimized and scalable. The queue prevents Service Requests from being accepted by more than one person. The queue uses rules to determine how many attempts will be made to reach the customer and adjusts the request's position in the queue to improve the likelihood that the call center will reach the customer. The queue visually changes the color of Service Requests to show when it is outside of call center hours in the customer's time zone. This minimizes the likelihood that technicians will contact customers before 8:00 AM and after 10:00 PM. If the customer has a Service Request in the queue and they call again the new Service Request will be grouped with their original request.

The MyService feature allows a customer to monitor position in the queue, remove themselves from the queue temporarily, cancel their Service Request and/or cancel their Service Request and create an appointment.

It is helpful for customers to be notified as quickly as possible when a Service Request is received. If too many appointments are scheduled, there may not be enough technicians available to respond to Service Requests in a timely manner. The Service Calendar is a multi-client, skills-based, resource scheduling system. Even though the system may be configured for one client (e.g. My Computer Works, Inc.) the system is capable of managing multiple call centers for multiple clients. Multiple appointment types can be defined. Each available appointment type may be displayed during the appointment setting process. Different appointment types are created to support appointments of varying lengths or for tracking purposes. When an Administrator creates a new Call Center they will specify the Client, Call Center hours of operation, the Call Center location, time zone and the skills for working in that call center. The default percentage of the Call Center workers' (technicians') time that is available for appointments is also established for each day of the week. When setting up users in Service Manager it is possible to define when they normally work and what skills they have.

When scheduling people to work in a call center, only employees that work for the right company, have the right skill set, and are available to work on the selected day can be assigned to work. Once the schedule for a given day has been created, the schedule can be used as a template to populate the schedule for other dates. It is also possible to manually override the percentage of technician time that is available for appointments on any selected day. The Calendar allocates available time for appointments based on the number of people that are working and the percentage of their time that is available for appointments.

In accordance with one embodiment, when setting an appointment the user will first find the customer in the database. The user may then select the appointment type and search for the first available appointment time slot. The next available appointment may be found in a single click, for example, by using a 'Find Next Appointment' feature. As a result, available appointment slots are displayed in the customer's time zone allowing the user to negotiate available appointment times without needing to adjust for time zone differences. When an acceptable appointment time is found the user may select a desired time by selecting an available time slot, enter a short description describing the work to be done, and select a link to complete the appointment. When the appointment has been made, the time slot that was selected may no longer displayed, preventing any double booking of that time.

Scheduled appointments for any specific day may be viewed in the customer's time zone or in the call center's time zone. In one embodiment, it is also possible to search for existing appointments by customer name. Existing appointments are shown on a time line and display the customer's name, the appointment notes, and the duration of the appointment. When selected, an existing appointment can be edited or canceled.

When customers log into the customer portal they may select a Schedule Service link in order to create an appointment. The system presents a series of questions in order to determine if the customer should schedule a Tune-up or whether additional services are desired. This may to be completed to determine the duration of the appointment. The customer may be directed to the first day where an appointment is available. The system adjusts the appointment times to compensate for differences in the customer's time zone and the call center's time zone. The customer may select the calendar to advance the day until they locate an appointment slot that is acceptable. When an appropriate appointment slot is located, the customer may select the slot and enter a brief note about their needs (System Tune-up or question). The system has the ability to limit the number of appointments based on the type of appointment. For example, the system may limit customers to one Tune-up appointment per year and one Issue appointment per month.

When appointments are within 24 hours of their scheduled time, for example, they may be converted to Calendar Service Requests and added to the queue. The duration between the appointment time and when they become Service Requests is configurable. Calendar Service Requests are color coded and remain at the bottom section of the queue until their appointment time is near.

With regard to the Calendar Summary, the system integrates with the Service Request Queue to provide appointment functionality in a queue environment. The system is able to manage resource scheduling for multiple clients. An unlimited number of Resource Pools can be managed by the system. The system manages List of Employee Skills. Employees with the desired skills can be assigned to work. The system manages employees' default work schedules. Once employees have been assigned to a day, that schedule can be copied to other days. This significantly reduces the time to maintain the call center work schedule. The percentage of time available for appointments is easily adjustable for each day. The system automatically adjusts for time zone differences between the customer and the call center. The system can find the next available appointment in a single click. Scheduled appointments can be displayed in the customer's time or in the local call center time. Scheduled appointments can easily be found, edited and canceled. Customers can schedule their own appointments.

When a technician has successfully reached the customer, the Service Request has been completed. Technicians will then create a new Ticket to document the support session. When a Service Request is closed, Service Manager automatically creates and opens a new Ticket. The Ticketing system may include a tabbed interface that has been optimized for maximum efficiency and is integrated with an existing billing system. When a ticket is first opened, the technician is presented the customer's contact details along with a list of services that the customer has purchased. At this point the technician needs to determine which computer the customer is calling about and select the correct service. Only active services are displayed, preventing a customer from calling and getting help on a computer that no longer has service. Team Leads can override this, when desired, if there is a billing dispute and they determine their service should be active. Once a service is selected, the technician can choose the appropriate type of ticket. For example, if the selected service is a PC Support subscription the technician needs to determine if they are calling for a Tune-up or about an Issue. Once the ticket type has been selected the technician is presented with a user interface that is optimized for the selected Ticket Type. If the Ticket Type selected is 'Issue' the description of their problem is copied from the Service Request into the Issue ticket. If the technician selected a Remote Backup subscription the system will detect that only one Ticket Type is possible and display the user interface that is optimized for Remote Backup issues. If the system detects that the technician is no longer talking with the customer it will remind the technician to take another call if they are able. While it's often not practical to take another call when working on a system there are times when technicians can work on several computers at once. Helping another customer while still working on a previous problem allows technicians to more easily meet their performance objectives; the prompt is used to encourage this behavior.

If there is a step-by-step procedure to follow for the Ticket Type or Problem Type specified in the Ticket, the Ticketing system will display the procedure as a checklist. Following these checklists will improve quality and save time by guiding technicians through the proper steps to solve problems. As technicians follow the procedure, they complete the checklist. The Ticketing system will record which items were not completed. This information can be used to provide feedback to technicians when problems were not resolved properly.

There are certain situations when there may be a need to collect additional data about the problem. An example would be a customer calling about a printer problem. When a call center addresses these issues, there is often a need to collect the name of the printer manufacturer and the model number of the printer. The Ticketing system may partially fill out the technician Problem description, prompting them to enter the data. This functionality can also be used to display a warning where appropriate. For example a Personal Digital Assistant (PDA) problem may require additional expertise and/or technician effort. Therefore, the call center may choose to address PDA problems if the customer pays an additional fee. The Ticketing system may prompt the technician to look for PDA service when they select PDA as the problem type.

When working on a computer it is often critical to know the history of the computer. Viewing the computer service history can be done by clicking on the History Tab. If the work history is too lengthy to be displayed on the page, the technician can navigate forward and backward through the history using forward and back buttons. The technician can also narrow the history results by specifying certain types of tickets they are interested in viewing.

With reference to FIG. 1, PC Support subscriptions are sold on a per-computer basis. It is important when a customer calls that the call center knows whether a computer has active service. This may be accomplished by collecting information from the computer that can later use to verify that a computer being addressed has active service. The computer's PID, Motherboard Serial Number and network card MAC address are the data elements used to positively identify a computer. Other details are also gathered about the computer configuration, networking settings, software installed, and the maintenance schedule. The Ticketing system communicates with the Multi-Tool and the System Scheduler to collect this information eliminating manual data entry. These tools are described below.

Knowing what is wrong with a computer frequently means finding out what happened just before the computer began to have a problem. When System Tune-ups are performed, the technician determines that everything is working properly on the client computer. If it can be automatically determined what has changed after the tune-up, the technician is not required to spend significant time diagnosing the cause of problems. When a technician works on a PC, they may use the Multi-Tool to collect the System Information described above. The technician may send this information to the Ticketing system to determine if they are working on a computer that has service. When changes to the System Information are detected by the Ticketing system; these changes are recorded. Technicians can simply click on the System Information History tab to see everything that has changed. The list of changes can be adjusted by the technician if they only want to look for certain kinds of changes; but this is usually not desired. By looking at the changes, a technician may timely view the cause of the new issue. For example, if the customer's system is locking up or rebooting often and the technician can see that they recently added memory to the computer; then the new memory is suspected.

The Knowledge Management may be integrated with the Ticketing system. Technicians can access the Knowledge Database by clicking on the Knowledge DB Tab while using the Ticket system. When the tab is displayed the search field is already populated whenever the technician's description of the problem has been populated in the Ticket. The technician can search for key words or search by entering a phrase. Results are displayed in a list which shows abbreviated descriptions of the problem and solution. When the technician selects one of the rows in the list the full detail for the problem and solution are displayed. Whenever the Ticket is updated the Knowledge DB is searched to see if there is information that matches the problem description. When results are found the Knowledge DB tab turns red to let the technician know information is available about the problem without them even having to navigate to the Knowledge DB tab. This encourages technicians to use the database before they spend time trying to figure the problem out on their own.

Information can easily be added to the Knowledge DB. Technicians can submit a problem and a solution by navigating to the Knowledge DB tab and clicking on the Add button. When they do this a new tab will be opened and the problem and solution from the Ticket are displayed. Technicians will edit the problem and solution, if desired and submit the information for inclusion in the DB. New submissions may be reviewed and approved by a Knowledge DB administrator before they are included in the database. Administrators are able to edit the submission before approving the submission when desired.

The dashboard provides a simple way to see the work that is being performed, the work that has been completed and to view performance statistics. The dashboard uses a tabbed interface, making it easy to change the dashboard's display to show different data. The dashboard defaults to the 'Today's SRs and Tickets' tab. This tab shows all open Service Requests and open Tickets. You can see the Ticket/SR #, customer name, which technician has it open, how long it has been open, and whether the technician is still on the phone, etc. The information can be sorted by any column and the list updates every 2 minutes or when the refresh button is clicked. Technicians can select tickets and open them, or they can open them in a read-only mode. With a single click, the list can be changed to show all of the completed Service Requests and Tickets. These views make it easy to see what's happening now and what has been accomplished on the current day. Other tabs include Tickets by User, Service Requests by User and My Daily Numbers. The Tickets by User shows the user all of their tickets for the current day. The user can choose a wider date range if they wish. The Service Requests by User tab works in the same way. My Daily Numbers shows the technician how they are performing against their objectives. This page shows the technician's average Ticket time, Call Time and Sales are displayed in comparison to their objectives, and also compared against the technician with the highest values in these areas. (The name of the technician with the highest performance is kept anonymous.)

It is often helpful to search through old tickets to see how a problem was solved in the past. The ticket Search Page makes it easy to do this. The search page that is used to find Service Requests is also used to search for Tickets. When the user changes the search mode from Find Service Requests to Find Tickets the user interface is altered and optimized for the type of item they are looking for. The user can select any ticket from the search results and open the ticket, or they can open the ticket in read-only mode.

When tickets are open the system is recording how much time a technician is working on the ticket. If the technician only wants to view the ticket contents, they will open tickets in Read Only mode. If the ticket is currently being worked on by someone else, the read-only copy will be updated every 60 seconds to show changes that are being made by the other technician. This will allow technicians to view the same ticket when discussing difficult problems with each other. It will also let supervisors monitor their staff to see if they are following procedures or are getting things done in a timely manner.

In accordance with one embodiment, the Ticketing system may use the technician's login and logout times to track when the employee is working. This information may be used to calculate technician performance.

An important technician measurement is time utilization. This is the percentage of time that a technician consumes while working on customer issues. There are times when the call volume is too low to maintain high utilization. When this happens Team Leads may tell technicians to go offline and the technicians' statuses are changed to offline. When technicians are offline, they may perform other tasks such as researching problems, cleaning up the database, etc. The Ticketing system records offline time and ensures it doesn't impact their utilization numbers.

The Ticketing Summary may include, for example, integration with a Service Request (Problem description from Service Request added to ticket); the User interface is optimized for the type of problem they are working on; the system informs technicians when they should try to Cross Sell other products; technicians are guided through procedures when appropriate and steps not completed are tracked; technicians are prompted to collect data or are warned of potential problems based on type of Issue; system integrates with Multi-Tool and System Scheduler to automatically collect System Information; single Click Ticket History; single Click System Information change history; dashboard makes it easy to see who is doing what and to reopen a ticket; tickets can be reopened in read-only mode and update every minute to show progress if another technician is working on the ticket; a user friendly Ticket Search page lets technicians search for previous solutions to problems; phone System Integration—Call duration is tracked with the Ticket duration; time Clock functionality; tracks Offline time; tickets closed automatically if the technician closes their browser; tickets auto-saved every 2 minutes; prevents accidental creation of new Tickets when incomplete Tickets exist;

Sales Manager is a Campaign management system which allows the system to track complex Pay for Performance campaigns. The system collects and translates call data from multiple sources and integrates with a billing system to match calls with sales.

The system can support an unlimited number of campaigns for an unlimited number of clients. Campaigns are given a name, description and defined as pay-per-sale or pay-per-call. If the campaign is pay-per-call, then the minimum call length for the call to be considered valid is also defined. All the marketing companies are then associated with the campaign and the amount of money they receive per call or sale is defined. It is possible to associate as many marketing companies (vendors) as desired. This allows a call center to run Campaign Performance reports by campaign and determine who needs to pay and how much is owed. Once the vendors have been associated with the campaign, the user needs to define the phone numbers that are associated with the campaign. An unlimited number of phone numbers can be assigned.

The source of the call records can vary per campaign. The data can come as an email attachment, be pulled from an FTP site, or be retrieved via a web service, to name a few. The need to provide a common reporting mechanism for all campaigns, combined with the sometimes brief nature Campaigns often have, presents a significant programming challenge. Instead of creating new utilities to retrieve data as needs change and discarding these utilities when campaigns end, a generic tool that can be used to meet data collection needs.

The Data Puller provides a visual interface that allows the creation of as many data retrieval jobs as desired. These jobs can be scheduled to run as needed and can be configured to pull data from varying sources using different credentials. The data retrieved is saved as a file in a configurable destination folder. The data puller also ensures that no file naming conflicts occur.

Data retrieved by the Data Puller can vary greatly in format and content. The Sales Manager needs all of the call data to be translated into a common format. Again, writing individual utilities to perform translation would create a programming resource problem every time the call center chooses to work with a new communications provider. To prevent this, a generic Data Processor application was created. The Data Processor's UI allows the user to schedule as many data processing tasks as needed. This processor has the ability to retrieve data from multiple sources, process the data in different ways and write the translated data to multiple destinations. The tool is used to read the collected data from files. Once the files are read, the system uses the translator to convert the data into the desired format. Once translated the sales data is written to the Sales Manager database. This tool can be used to translate, synchronize and distribute data. As new needs arise the system can easily be extended to add new translators, data readers and writers.

The Sales Manager searches for new call records each time a report is run. Every time a new call record is found the system will look at the number that was dialed to determine which campaign to associate with the call. When found, the call record is updated to link it to the appropriate campaign. The system then looks at the associated campaign details to determine if the call is part of a pay-per-call campaign or a pay-per-sale campaign. If it's a pay-per-call campaign, the call duration is analyzed to determine if it was long enough to qualify for payment. If so, the call record is updated to reflect this. The system then checks to see if the number that the call was placed from has ever been used to call us and if it the previous call qualified for payout. If someone has called us before from the same number and the previous call qualified for payout to the vendors then the new call record is marked as a dupe and the details field is updated, providing details about the duplication. Finally the Sales Manager searches the customer database looking for any customer that has the caller's phone number. If a match is found the system then looks for transactions that occurred on the date of the phone call or after. If found the system checks to see if that transaction was associated with any other calls in the system. If not then that sale is associated with the call record. When the sale is associated, the call record is also updated to reflect the salesperson that answered the call and the details field is updated with additional information about the sale.

Call reports can be run on any combination of Campaigns and date ranges. There are multiple options available, providing all the flexibility needed to monitor campaign performance.

Practitioners will appreciate that every call that is received at a call center should be treated as a sales lead. In one embodiment, a call that doesn't result in a sale may be added to Sales Lead system. The system allows the user to search these leads based on any information that has been obtained from the lead such as, for example, Sales Campaign, date the call was received, whether the call was answered, how many times were made to reach the lead, and the like. The results may be exported to Excel, for example, for analysis or the user may create a new outbound campaign that will be populated with the results of a search. Additional rules for an outbound campaign may also be configured, such as the number of call attempts before removed from the campaign, duration of the campaign, etc. Users may open campaigns from a list of outbound campaigns. When opened, the system may present each lead to them as it appears in the list on a Lead Contact page. In one embodiment, the lead contact page will display the name of the lead and their phone number along with any other information that has been collected by a salesperson, for example. If the campaign has already been conducted, the user may be brought back to the position in the lead list they were currently at when they last closed the outbound campaign. From the Lead Contact page, the user may select a link to dial the lead's phone number and enter details about the result of the call, including whether they reached the lead, what their response was, their level of interest, and reasons why they weren't interested. The lead may also be manually removed from the list if the lead requests this. If the lead is interested but does not wish to purchase now, the user can create a follow up appointment to call them at a later time. All user actions are recorded and this data is available for salesperson activity reports. This is used to determine if salespeople are making the desired amount of calls, and determine their close rates under different conditions.

Sales leads may be removed from the outbound campaign and added to the salesperson's lead calendar. These appointments are scheduled in the same way as appointments for service. Sales lead appointments can also be manually entered into the system by the salesperson. These appointments can be opened to the Call Lead Contact page so the salesperson can record the result of the appointment and reschedule the appointment if desired.

The Sales Manager may include, for example, Data Puller—Data retrieval is flexible, scalable, configurable, and includes much less programming effort when enhancements are desired; Data Processor—Data translation is flexible, scalable, configurable, and includes much less programming effort when enhancements are desired; System can be used with an unlimited number of customers; System can support an unlimited number of campaigns; Campaign configuration supports very complex pay-per-call and pay-per-sale structures; Campaign reports make it easy to measure campaign performance; Call records that didn't result in a sale are converted to sales leads; Sales leads from other sources can be translated and added to the leads database; Outbound campaigns can be created based on any known information about leads; Previous progress is maintained when reopening outbound call campaigns; Call disposition details are captured when the lead is contacted; Leads are automatically removed from a campaign based on contact rules; Salespeople can easily create a follow-up appointment from any lead; Salespeople can manually add leads to their calendars; Reports can be run to show salesperson activity, close rates, number of calls made etc; and Click-to-dial feature integrates with the phone system.

In one embodiment, a Tune-up process installs several tools that keep the customer's computer up to date and free of viruses, malware, and excessive temp files. Many of the tools used to accomplish this do not have built-in schedulers. To make these maintenance processes run regularly the system may use Windows' built-in scheduler. Using the scheduler to do this is a complicated task. The problem is compounded by the fact that some of the schedules need to be set up differently in Windows XP than in Windows Vista. Due to this complexity it would often take 10 minutes or more to set up the schedules. It was also common for technicians to make mistakes when creating the schedules, which could generate additional calls for support or reduce the value of the tune-up. This work is now done by the System Scheduler. This tool recognizes which applications need to be scheduled to run based on whether or not they are installed. It also knows which operating system the customer is using so it can create the schedules properly. The most common settings are used as default values so the technician often just needs to click one button to create the schedules. From the time the program is run until the process is complete can last as little as 10 seconds. Once complete the technician is prompted for the ticket number he is working on. Once entered, the System Scheduler sends the Scheduled Maintenance information to the Ticketing system and that information is automatically updated in the ticket.

In one embodiment, the system scheduler is configured with a program that schedules all the desired tasks in seconds; adjusts for Operating System, Programs installed and Laptop or Desktop; and sends System Maintenance information to the Ticketing System. This saves 10 to 15 minutes on every Tune-up, reduces follow-up calls to fix system maintenance schedule issues and reduces the training to teach technicians how to properly set up Scheduled Maintenance.

Technicians use a variety of freeware tools when working on customers' computers. Technicians also use many of the administrative and troubleshooting tools that are built into Windows itself. Many of these tools don't meet the needs of the technician, and technicians often switch from tool to tool to accomplish their work.

The Multi-Tool is a single application that assists technicians by replacing freeware tools with functionality that better meets technician needs and provides navigation shortcuts to common Windows Administrative tools. The tabbed user interface makes it easy to switch between different sets of functionality and also lends itself to the addition of added functionality in the future.

Again, referring to FIG. 1, the System Information tab 100 displays critical information about the computer system's hardware and operating system. The information displayed may contain the unique identifiers that may be used to ensure that services being administered to a PC are for a PC that has active service. Information displayed includes PID, Network MAC address, Operating System, Service Pack Installed, User Name, System Memory, Manufacturer, Model Name and other system data. It also tests the computer to ensure it meets defined specifications. If the computer does not meet the defined specifications, the technician may be instructed as to what needs to be changed to correct the shortcoming. The Multi-Tool can send displayed system information along with other Software and Hardware inventory data to the Ticketing system directly, eliminating the data entry for keeping records current. System information is sent by clicking on a Send button and providing the Multi-Tool with the Ticket # the technician is working on.

Figure 2:
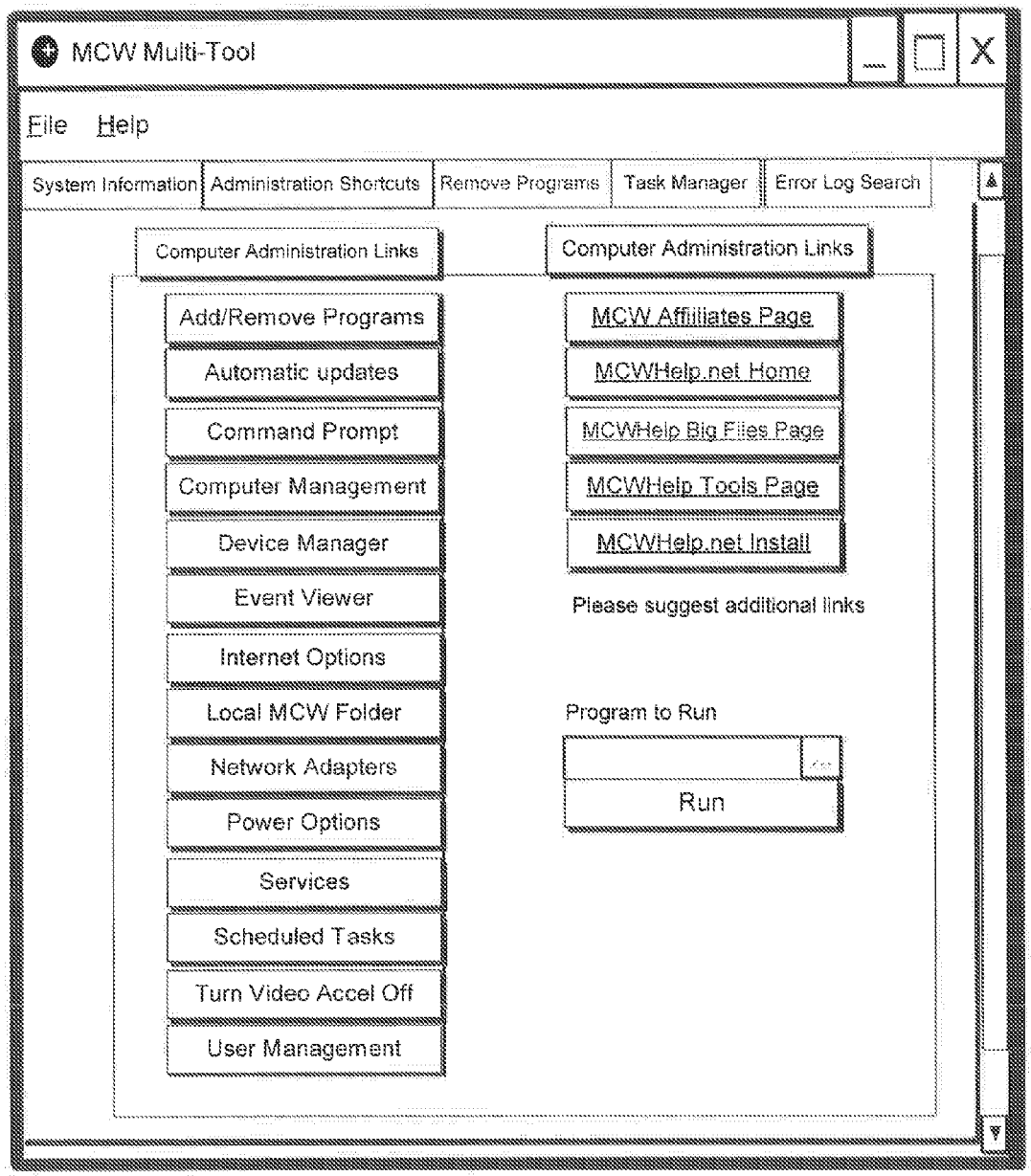
FIG. 2 illustrates a screenshot of an Administration Shortcuts Tab for remotely maintaining a PC, according to an embodiment of the present invention.

With reference to FIG. 2, the Administrative Shortcuts Tab 200 enables technicians to navigate to all common Windows administration tools with a single click (Automatic Updates, Computer Management, Device Manager, Event Viewer, Network Adapters, Power Options, Services, and Scheduled Tasks etc). The tab also includes several shortcuts to commonly used web site resources. Finally, the technicians can type in the name of a program and click a button to execute it.

Figure 3:
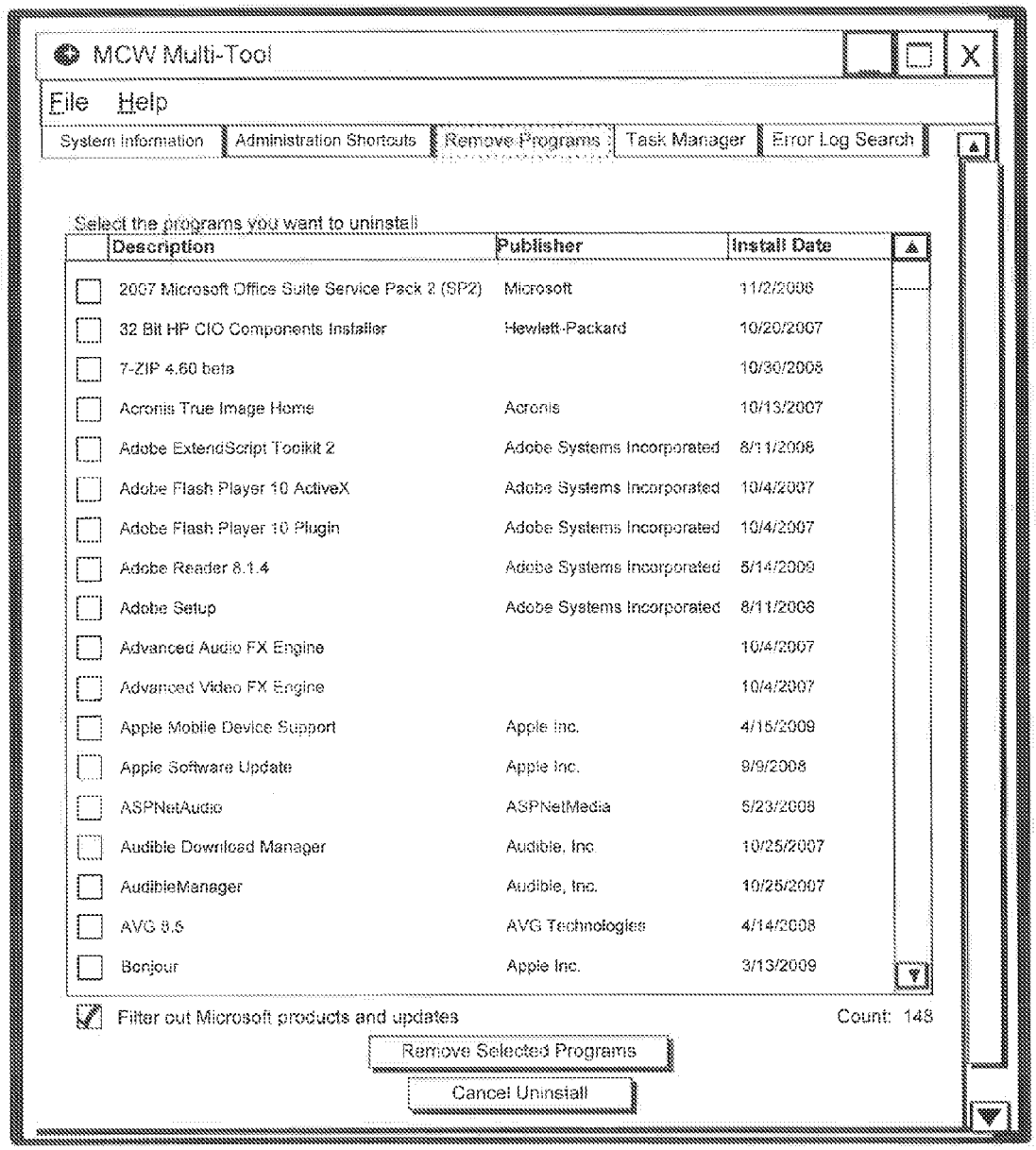
FIG. 3 illustrates a screenshot of a Remove Programs Tab for remotely maintaining a PC, according to an embodiment of the present invention.

With reference to FIG. 3, the Remove Programs tab 300 gives the customers an easier way to remove programs from computers. The built-in Add/Remove programs can take a long time to populate and only lets you remove one program at a time. This tool lets you select multiple programs you want to remove and remove them all with a single click. The list also shows you the date the program was installed. If the program was installed within the last 30 days, the install date is displayed in Red to alert the technician that this program could be to blame for recent problems.

Figure 4:
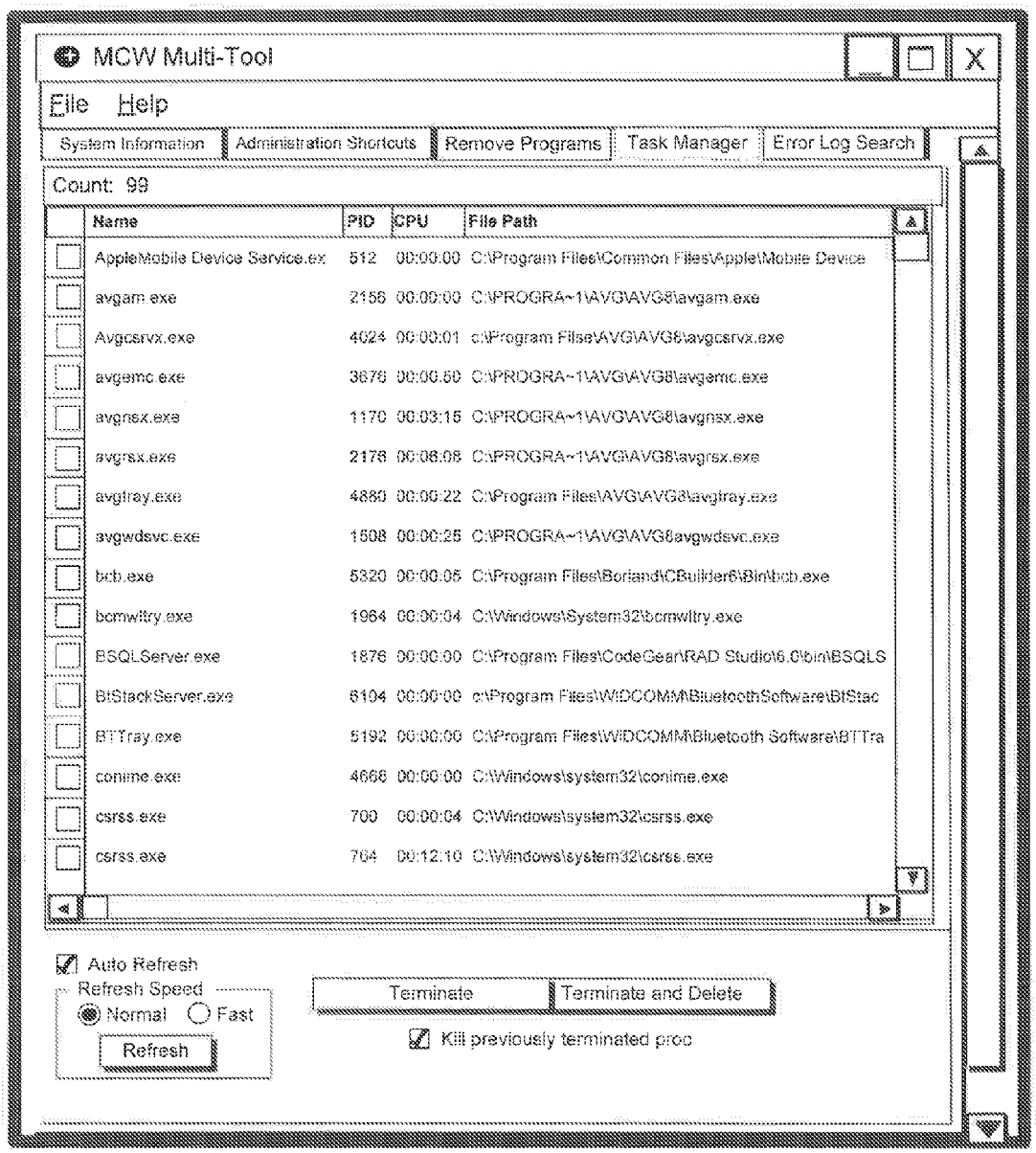
FIG. 4 illustrates a screenshot of a Task manager Tab for remotely maintaining a PC, according to an embodiment of the present invention.

With reference to FIG. 4, the Task Manager tab 400 gives technicians access to a more powerful and informative Task Manager. The enhanced Task Manager provides the path and file name of each program that is running. Technicians can also select multiple processes and terminate them with a single click. The tool also recognizes if Terminated services are restarted and keeps terminating them automatically.

Figure 5:
FIG. 5 illustrates a screenshot of a Error Log Search Tab for remotely maintaining a PC, according to an embodiment of the present invention.

With reference to FIG. 5, the Windows error log 500 contains very useful information that is often critical when diagnosing system problems. The problem is that it also contains a great deal of data that you don't need to see. Because of the time used to search the Windows error log, it is often not where technicians start when troubleshooting a problem. The Multi-Tool has been written to scan through tens of thousands of error log entries automatically and look for some of the most common and critical problems. This error log scan begins as soon as the Multi-Tool starts up and completes the scan in about 20 seconds. If critical errors are found, the Multi-Tool alerts the technician that critical problems were found and displays these problems in the Error Log Search tab. Technicians can click a button at the bottom of this tab to copy the critical error log information to the clipboard for inclusion in their ticket. Technicians can also use the Error Log Search tab to manually search for critical events manually.

The System Tuning tab provides technicians an easy interface for tuning system settings. The Multi-Tool examines the computer and selects the tuning options it believes should be made. The technician can adjust these settings and apply the changes in a single click.

When the Multi-Tool is run, it begins to delete temp files. This is done in the background and does not prevent the technician from using other functions. Removing these temp files significantly reduces the time to scan for Viruses and Malware. The Multi-Tool, for example, determines if the system meets minimum defined requirements; displays critical system information to technicians; collects hardware and software information that can easily be sent to the Ticketing system to populate that section of the ticket with minimal or no data entry; provides shortcuts to common locations to reduce navigation time; provides a more efficient way to remove programs from computers; contains a more powerful Task Manager that is useful when investigating running programs or trying to terminate rogue processes; scans Windows event logs for critical information dramatically reducing troubleshooting time when problems are detected; provides an easy way to search for all critical events in Windows Event logs; copies critical event information to the clipboard with a single click making it easy to add the information to the Ticket; and recommends changes that improve performance, which may be applied with a single interface selection.

When technicians perform a Tune-up on computers that have recently been signed up for service they install the Agent. The agent consumes a low amount of system resources and runs in the Windows system tray until activated.

The agent periodically contacts Service Manager and checks to see if the computer has active service. If the computer has active service then the blue icon is displayed. If the compute does not have active service the icon turns red and records the lack of service in the system's registry database. When the system is restarted the program will display a message to the user informing them that their service is not active and is not being protected by the system. The message displays a customer service phone number and a link to the customer portal that they can use to log in and correct the problem. If active service has not been restored within 30 days, for example, the agent may remove any proprietary enhancements that have made to the computer and then uninstall itself.

The agent will detect when the system is idle and periodically examine the system, looking for critical problems. These problems include low hard drive space, hard drive errors, user environment corruption and other items. When problems are detected the agent will send an email with the problem information to Service Manager. Service Manager will create a new Proactive Service Request which contains the description of the problem and add it to the queue.

If a customer wants help they can request it by double-clicking on the agent icon and selecting 'Get Help Now'. The customer will be prompted to enter a description of the problem and their request will be sent to Service Manager. Once the Service Request has been created the program will begin displaying their position in the queue. When service is requested using the agent Service Manager knows for certain that the computer has active service. When this is known the technician doesn't need to manually confirm active service when connecting to the computer.

The agent may recognize when technicians are remotely connected and display a 'Verify Service' feature. Technicians will click on this and enter the ticket number they have created for this customer. The Agent will communicate with the Ticketing system, causing the correct service to be selected and confirming to the technician that the computer has active service.

In one embodiment, the agent summary Displays Service Status (Active, or non active); Critical problem scan and notification; Customers can click on the icon and request service; Customers can monitor their position in the queue; and Service Verification—Reduces technician time to verify computer has service.

Troubleshooting Intermittent Connectivity problems is one of the most difficult and costly problems to troubleshoot. Detecting and isolating the problem often involves a technician on site and constantly looking for a connection problem to occur. Once disconnected, they need to run another test to determine where the problem is before the connection begins working again. IPWatchDog automates this time consuming process. When it is suspected that a customer has a connectivity problem a technician may configure, download and run the program on the customer's computer. When the program is run it will begin to monitor for a connection failure. When a failure is detected the program will perform a trace to determine where on the network the problem is occurring. All downtime, packet loss and trace information is recorded in a text log for later analysis. The program can be configured by a technician to send the log to Service Manager once problems are detected. Service Manager will retrieve the log file and attach it to a Service Request that is added to the queue. When a technician accepts the Service Request they will look at the test results and take the proper action. If the program detects a connection problem the report will contain all the information desired to prove to the ISP that their service isn't working properly, or identify the problem on the local network. The program may be configured to run for a specified number of days and then uninstall itself. This prevents the tool from consuming resources on the customer's machine and generating network traffic indefinitely. Once configured the program is aware of the unique characteristics of the customer's computer and can only be run on that computer. This prevents the program from being used by anyone else.

In summary, the IPWatchDog may, for example, identify source of intermittent connection problems; program preconfigured via IPWatchDog web administration control panel; execute on a specified machine; execute for a predetermined duration then uninstall itself; download preconfigured applications from the administration control panel or sent via email to the customer; and integrate with Service Manager to transmit test results to Service Manager which adds to a Service Request.

In accordance with one embodiment, the system architecture includes an RTR Database Layer. Much of the time spent creating a database application is consumed with the repetitive and simple task of writing queries and assigning the results to fields or variables. Many of the bugs encountered when troubleshooting problems are also found in this layer of the program. The RTR Database Layer eliminates the need to perform this type of programming by passing requests for data and database updates through a single instance of a proxy. The caller creates an empty instance of a Value Object that contains variables that match the field names in the database table to be searched or updated. The empty Value Object is then populated with the values of the record to be added/updated, deleted or the data that will be used in the query. The object is passed to the appropriate method in the Proxy Object based on the action that needs to be performed (i.e. AddUpdate, GetRecords or Delete). The proxy will send the object to the RTR Database layer where the name of the object is determined using reflection. The database table name is derived from object name and the object fields are analyzed to build the appropriate SQL query. The query is executed and the results are returned to the proxy.

If GetRecords has been called perform a query the proxy will create a Value Object that matches the structure of each record returned and populate the empty Value Object with the data in each record returned by the query. Once each row has been processed an array of Value Objects that have been populated with the query results is returned to the calling program.

If AddUpdate has been called to Add or Update a record then the record Id of the new or updated record is returned when successful. If unable to add or update a record the value of −1 is returned. If the Delete method has been to delete a record a value of true will be returned when the record was found and deleted or false if no record was deleted.

The RTR Database Layer uses reflection to build queries in real time. If the query is too complex to be built automatically or spans multiple tables the caller can build the query manually and pass it to the RTR Database Layer. When supplying a query the caller may also provide an object that will serve as a template for the query results returned. This allows complex queries to be executed while still maintaining the automatic data assignment to Value Objects. The RTR database engine supports all major Relational Database products such as Microsoft SQL Server, My SQL and Oracle. The RTR Database Engine can easily be extended to support other platforms.

Advantages of the RTR database may include, for example, multi-platform support (Microsoft SQL Server, MySQL server, Oracle); the need to write most queries is eliminated; auto generated queries are parameterized eliminating SQL injection risks; queries are generated in real time eliminating the code generation requirement often associated with object relational mapping tools; the need to manually assign query results to variables or Value Objects is eliminated; complex queries still benefit from automatic assignment of results to Value Objects; and the code layer that requests information from or updates the database doesn't need to have any database understanding.

There are varying ways in which a Service Request may be received. It, for example, a Service Request is received from a customer by a staff member, a representative answers the call; obtains the caller's name; and performs a search of the caller in a database of registered customers. If the caller is identified as a customer from the database, then the customer data is populated into a Service Request, the description of the problem is entered into the Service request, and the Service request is saved.

When a Service Request is received from a customer via voice message, then the voice message is retrieved from a voicemail email address by Service Manager VM Request Retrieval Service. The voice attachment may be saved to the correct folder on the Service Manager Server, a new Service Request created based on the attachment, and the system attempts to locate the customer using phone number in the caller ID string. In one embodiment, the system may use the caller ID string to locate the customer by a last name. If the customer is located in the database, then Service Request details are populated and the Service Request is saved.

A Service Request may be received via email from a customer. In one embodiment, for example, the customer logs into the customer portal using their username and password provided when they established service; the customer is directed to a Get Help Now page after logging in; the customer selects 'Email a technician' from the Get Help Now page; the customer enters their question or description of the problem in the 'Your Question' field; the customer clicks Submit to send request; the customer ID is added to subject line of the email and the question is sent to a support email address; an email message retrieved from the support email address by Service Manager Email Request Retrieval Service; a new Service Request created; a customer search performed using the customer ID retrieved in the email request; the customer details are used to populate Service Request; and the Service Request is saved.

In another embodiment, the system may implement a proactive approach to providing service to a customer. Such a proactive approach may include, for example, detecting a system problem for a client computer of the customer; sending a notification to Service Manager, wherein the Service manager retrieves the Proactive Service Request. Based on the Proactive Service Request the Service Manager creates a new service request and performs a customer search the customer ID retrieved in the Email Request. When the customer information is retrieved, then the customer details are used to populate the Service Request and the Service request is saved.

In yet another embodiment, the system includes a call center calendar configuration. In accordance with this embodiment, for example, an administrator creates a new call center; a client is assigned to the call center; the call center name is established; a description of the call center is entered; the local hours and time zone for the call center are set; desired skill sets are identified; and default appointment allocations are set for each day.

In a further embodiment, the system enables staff to set an appointment by, for example, searching for a customer in a database; selecting a matching customer; selecting a 'Schedule Appointment' link within an interface; confirming the customer time zone; adjusting the customer time zone if desired; selecting the correct appointment type; locating a next available appointment (manually or using a Find Next feature); selecting a desired appointment time slot; entering appointment notes; and selecting a 'Set Appointment' interface link.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "includes", "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

I claim:

1. A computer implemented method comprising:
creating, by a computer-based system for building queries, an empty value object, wherein the empty value object comprises a plurality of variables corresponding to fields in a database table;
populating, by the computer-based system, the value object with values of a database record;
sending, by the computer-based system, the value object to an appropriate method in a proxy based on an action to be performed, wherein the appropriate method comprises at least one of add/update, get records, or delete;
sending, by the computer-based system and from the proxy, the value object to a database layer, wherein the database layer determines a name of the value object using reflection;
determining, by the computer-based system, a name of the database table based on the name of the value object;
building, by the computer-based system, a parameterized query in real time based on the fields, wherein the parameterized query eliminates SQL injection risks;
executing, by the computer-based system, the query;
providing, by the computer-based system, a template for results of the query;
returning, by the computer-based system, the results of the query to the proxy;
wherein, in response to the appropriate method being get records, the proxy creates a result value object that matches a structure of a record returned by the query and populates the result value object with data in the record returned by the query, and
wherein, in response to the appropriate method being add/update, a record ID of the record returned by the query is returned to the proxy; and
assigning, by the computer-based system and using reflection, the results of the query into the result value object.

2. The method of claim 1, wherein the appropriate method is a get records method.

3. The method of claim 2, wherein the results comprise a plurality of records.

4. The method of claim 3, further comprising creating, by the computer-based system, a plurality of empty value objects that match a structure of the records, and populating the plurality of empty value objects with data in the records.

5. An article of manufacture including a tangible, non-transitory computer-readable storage medium having instructions stored thereon that, in response to execution by a computer-based system for building queries, cause the computer-based system to perform operations comprising:
creating, by the computer-based system, an empty value object, wherein the empty value object comprises a plurality of variables corresponding to fields in a database table;
populating, by the computer-based system, the empty value object with values of a database record;
sending, by the computer-based system, the value object to an update method in a proxy;
sending, by the computer-based system and from the proxy, the value object to a database layer, wherein the database layer determines a name of the value object using reflection;

determining, by the computer-based system, a name of the database table based on the name of the value object;

building, by the computer-based system, a parameterized query in real time based on the fields, wherein the parameterized query eliminates SQL injection risks;

providing, by the computer-based system, a template for results of the query;

updating, by the computer-based system and based on the query, the database record;

returning, by the computer-based system and based on the template, results of the query comprising a record ID of the database record to the proxy;

returning, by the computer-based system and in response to an unsuccessful update attempt, a value of −1; and assigning, by the computer-based system and using reflection, the results of the query into a result value object.

6. The article of claim 5, further comprising returning, by the computer-based system, the results to a caller.

7. The article of claim 5, wherein a caller builds the query manually and passes it to the database layer.

8. The article of claim 5, further comprising returning, by the computer-based system, an array of value objects that have been populated with the results of the query.

9. The article of claim 7, wherein the results of the manually built query are assigned into the result value object based on the template.

* * * * *